United States Patent
Patel et al.

(10) Patent No.: US 10,970,415 B2
(45) Date of Patent: Apr. 6, 2021

(54) SENSITIVE DATA REDACTION IN MEMORY DUMP

(71) Applicant: International Business Machines Corporation, Armonk, NY (US)

(72) Inventors: Purvi Sharadchandra Patel, Rock Hill, SC (US); Elpida Tzortzatos, Lagrangeville, NY (US); Scott B. Compton, Hyde Park, NY (US); Hong Min, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/515,136

(22) Filed: Jul. 18, 2019

(65) Prior Publication Data

US 2021/0019442 A1    Jan. 21, 2021

(51) Int. Cl.
*G06F 21/62*    (2013.01)
*G06F 12/1009*    (2016.01)
*G06F 21/60*    (2013.01)
*G06F 9/54*    (2006.01)
*G06F 12/02*    (2006.01)

(52) U.S. Cl.
CPC .......... *G06F 21/6245* (2013.01); *G06F 9/54* (2013.01); *G06F 12/0246* (2013.01); *G06F 12/1009* (2013.01); *G06F 21/606* (2013.01)

(58) Field of Classification Search
CPC .. G06F 21/06245; G06F 9/54; G06F 12/1009; G06F 21/606
See application file for complete search history.

(56) References Cited

U.S. PATENT DOCUMENTS

| | | | |
|---|---|---|---|
| 8,260,871 B2 | 9/2012 | Fallen et al. | |
| 8,468,244 B2 | 6/2013 | Redlich et al. | |
| 9,026,860 B2 | 5/2015 | Akirav et al. | |
| 9,043,612 B2 | 5/2015 | McCoy | |
| 9,043,656 B2 | 5/2015 | Akirav et al. | |
| 9,251,339 B2 * | 2/2016 | Bullis | G06F 21/50 |
| 2007/0033367 A1 | 2/2007 | Sakarda et al. | |
| 2007/0208954 A1 | 9/2007 | Van Riel et al. | |

(Continued)

OTHER PUBLICATIONS

Anonymously; "Machine Learning Algorithms for Smart Meter Diagnostics." IP.com, Jul. 16, 2015. 53 Pages.

(Continued)

*Primary Examiner* — Ryan Bertram
*Assistant Examiner* — Edmund H Kwong
(74) *Attorney, Agent, or Firm* — Cantor Colburn LLP; Teddi Maranzano

(57) ABSTRACT

Examples of techniques for sensitive data redaction in a memory dump are described herein. An aspect includes, based on a dump of a virtual address space being triggered, receiving a primary dump corresponding to the virtual address space, the primary dump including one or more tagged memory pages. Another aspect includes identifying, by a sensitive data identification module, sensitive data that is located outside of the of the one or more tagged memory pages in the primary dump. Another aspect includes redacting data corresponding to the sensitive data and the one or more tagged memory pages to determine a redacted dump.

20 Claims, 4 Drawing Sheets

(56) References Cited

U.S. PATENT DOCUMENTS

| | | | |
|---|---|---|---|
| 2007/0255912 A1* | 11/2007 | Kelly | G06F 21/6245 711/159 |
| 2008/0288548 A1* | 11/2008 | Lawler | G06F 21/6227 |
| 2015/0058997 A1 | 2/2015 | Lee et al. | |
| 2015/0113242 A1* | 4/2015 | Abrams | G06F 12/1458 711/163 |
| 2015/0161397 A1* | 6/2015 | Cook | G06F 21/6254 726/26 |
| 2016/0080396 A1 | 3/2016 | Feng et al. | |
| 2017/0147240 A1 | 5/2017 | Tsirkin et al. | |
| 2017/0323110 A1* | 11/2017 | Griffith | G06F 11/366 |
| 2019/0073473 A1 | 3/2019 | Vanderleest | |
| 2020/0250334 A1* | 8/2020 | Bandi | G06F 21/6245 |

OTHER PUBLICATIONS

Anonymously; "Phishing Kits Detection." IP.com. Mar. 23, 2018. 4 Pages.

Bittau et al. "Wedge: Splitting Applications into Reduced-Privilege Compartments." NSDI. vol. 8. 2008. 23 Pages.

Coppola et al. "Trusted computing on heterogeneous embedded systems-on-chip with virtualization and memory protection." Cloud Computing (2013). 5 Pages.

Dalton et al., . "Raksha: a flexible information flow architecture for software security." ACM SIGARCH Computer Architecture News 35.2 (2007): 482-493.

Gonzalez, . Taxi: defeating code reuse attacks with tagged memory. Diss. Massachusetts Institute of Technology,2015. 111 Pages.

IBM "List of IBM Patents or Patent Applications Treated as Related; (Appendix P)", Filed Jul. 18, 2019, 2 pages.

Patel et al., "Sensitive Data Redaction in Memory Dump," U.S. Appl. No. 16/515,141, filed Jul. 18, 2019.

Woodruff, et al. "The CHERI capability model: Revisiting RISC in an age of risk." Computer Architecture (ISCA), 2014 ACM/IEEE 41st International Symposium on. IEEE, 2014. 12 Pages.

Zeldovich et al. "Hardware Enforcement of Application Security Policies Using Tagged Memory." OSDI. vol. 8. 2008. 16 Pages.

Hoffman, Chris; "What is an API"; Mar. 21, 2018; retrieved from: https://www.howtogeek.com/343877/what-is-an-api/ on Aug. 13, 2020 (Year: 2018).

* cited by examiner

SENSITIVE DATA REDACTION IN MEMORY DUMP

BACKGROUND

The present invention generally relates to computer systems, and more specifically, to sensitive data redaction in a memory dump in a computer system.

Computer systems may store relatively large amounts of personal user data. Many types of websites (for example, banks, retailers, and social media) may collect and store potentially sensitive personal user data, including but not limited to names, addresses, credit card numbers, social security numbers, and personal health information on a computer system. If sensitive or otherwise protected (e.g., by data privacy regulations) user data falls into the wrong hands, legal repercussions, fraud, identify theft, or similar harm may occur. A security breach may also result in a loss of consumer trust in an organization.

SUMMARY

According to an embodiment described herein, a system can include a processor to, based on a dump of a virtual address space being triggered, receive a primary dump corresponding to the virtual address space, the primary dump including one or more tagged memory pages. The processor can also identify, by a sensitive data identification module, sensitive data that is located outside of the of the one or more tagged memory pages in the primary dump. The processor can also redact data corresponding to the sensitive data and the one or more tagged memory pages to determine a redacted dump.

According to another embodiment described herein, a method can include, based on a dump of a virtual address space being triggered, receiving a primary dump corresponding to the virtual address space, the primary dump including one or more tagged memory pages. The method can also include identifying, by a sensitive data identification module, sensitive data that is located outside of the of the one or more tagged memory pages in the primary dump. The method can also include redacting data corresponding to the sensitive data and the one or more tagged memory pages to determine a redacted dump.

According to another embodiment described herein a computer program product may include computer readable storage medium having program instructions embodied therewith, the program instructions executable by a processing device to cause the processing device to perform a method including, based on a dump of a virtual address space being triggered, receiving a primary dump corresponding to the virtual address space, the primary dump including one or more tagged memory pages. The method can also include identifying, by a sensitive data identification module, sensitive data that is located outside of the of the one or more tagged memory pages in the primary dump. The method can also include redacting data corresponding to the sensitive data and the one or more tagged memory pages to determine a redacted dump.

DETAILED DESCRIPTION

Figure 1:
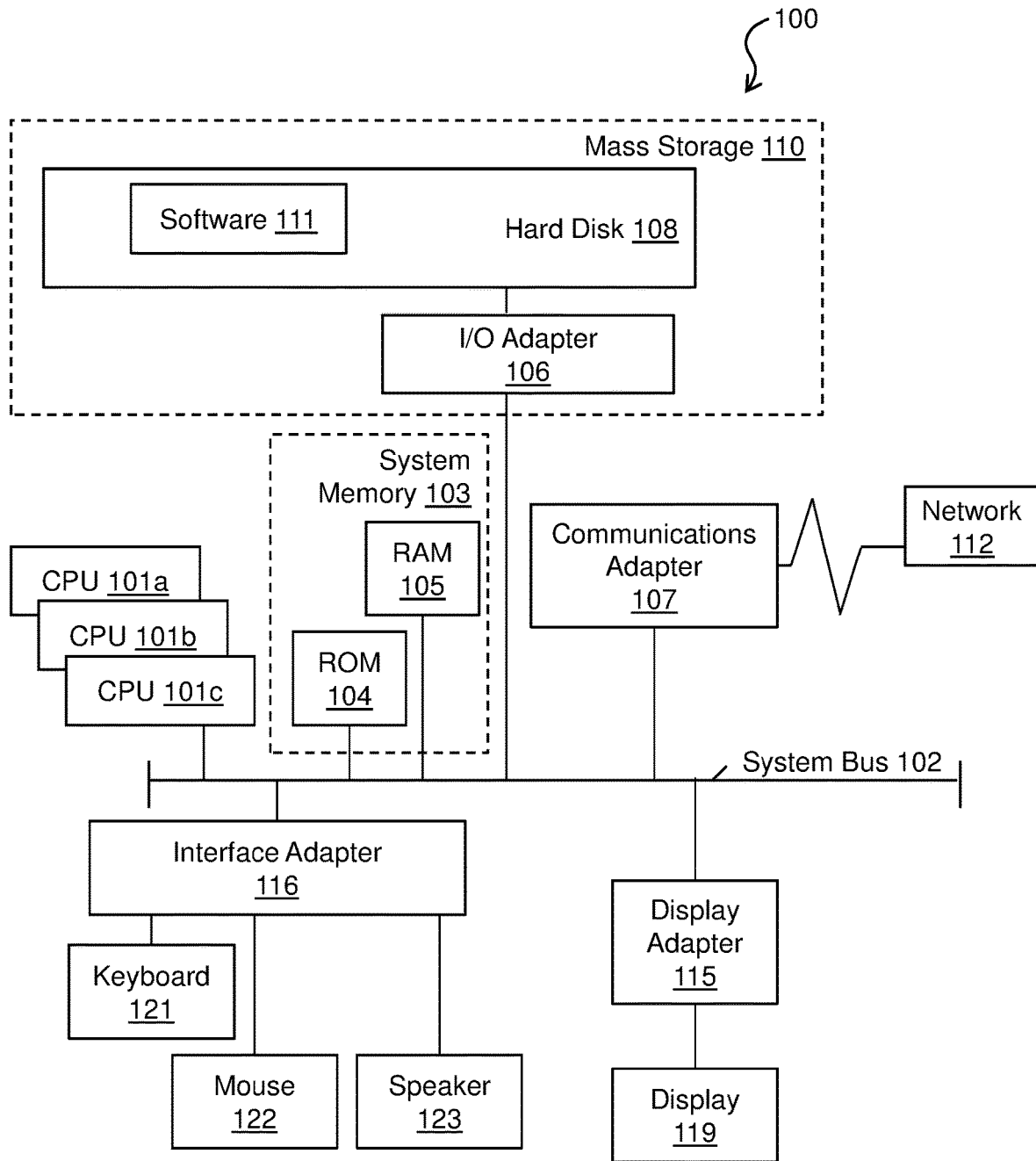
FIG. 1 is a block diagram of an example computer system for use in conjunction with one or more embodiments of sensitive data redaction in a memory dump.

One or more embodiments of the present invention provide sensitive data redaction in a memory dump. An operating system (OS) of a computer system may generate memory dumps in response to errors. A memory dump causes the contents of a memory region to be displayed and/or stored in case of an application or system crash. The contents of the memory dump may help software developers and system administrators to diagnose, identify, and resolve a problem that caused an application or system failure. When capturing a memory dump, a dumping module gathers data to include in the dump based on options specified by the invoking program. Memory tagging allows an application to tag any virtual memory pages that contain sensitive data. The dumping module may then determine whether any data in an address space that is targeted for a memory dump is sensitive based on the memory tagging, and may redact any sensitive data in the dump. A sensitive data identification module may also analyze untagged memory pages in the dump for potentially sensitive data, and identified sensitive data may also be redacted from the dump.

Memory tagging may be performed via calls from an application to an application programming interface (API). The API may be supported by an OS that enables execution of the application. Calls to the API may be included in the source code of a software application by, for example, a computer programmer. A virtual memory page that is allocated to the application may be tagged as sensitive at the time of allocation. A virtual memory page may also be tagged as sensitive after allocation, and may be untagged and/or retagged as sensitive, or not sensitive, during execution of the application through subsequent API calls from the application. Virtual memory pages may also be tagged as non-sensitive using the API. Using the memory tagging API, an application can identify any virtual memory pages where sensitive data will reside either at memory allocation time, or later, when the sensitive data is copied to a memory location. Based on memory locations having been identified as containing sensitive data via tagging, a post processor of the OS may redact (e.g., remove or encrypt) the data from tagged memory locations in a memory dump that includes any tagged memory locations. The redaction may prevent unauthorized personnel from gaining access to sensitive, confidential, or otherwise protected information via a memory dump. The sensitive or non-sensitive tagging of memory pages in the dump is propagated in page metadata from the operating system to a post processor when one or more tagged pages are captured in a primary dump.

In embodiments in which an application may not know the specific locations of sensitive data that is generated or used by the application, the application may not be able to identify sensitive data in the memory using the memory tagging API. The post processor may include a sensitive data identification module that analyzes the primary dump for sensitive data based on, for example, one or more machine learning models. In some embodiments, the sensitive data identification module in the post processor may examine untagged pages in the primary dump for sensitive data in order to reduce the impact of an error in the computer system; in such embodiments, data located in tagged pages (both sensitive and non-sensitive) may not be analyzed by the sensitive data identification module.

The sensitive data identification module may identify sensitive data in the primary dump based on any appropriate sensitivity criteria. In some embodiments, the sensitive data identification module may include one or more pre-trained machine learning models based on privacy regulations, including but not limited to General Data Protection Regulation (GDPR) and Health Insurance Portability and Accountability Act (HIPAA). For example, an email address such as abc1234@xyz.com, which may uniquely identify a person and is therefore sensitive data under GDPR, may have certain format and certain domain name constraints that may be identified by the sensitive data identification module. In another example of data that may be identified as sensitive by the sensitive data identification module, a medical professional identifier may have a prefix or suffix such as "Dr", "MD", or "RN" associated with an individual's name, and may therefore be sensitive data under HIPAA. In some embodiments, the sensitive data identification module may use a redaction string provided by a user to overwrite identified sensitive data strings. In some embodiments, the sensitive data identification module may tag an entire page as sensitive in the page metadata. The sensitive data identification module may create a work file including string redactions and/or page tagging inserted into the data of the primary dump by the sensitive data identification module.

Pages that have been tagged as sensitive by either the API or the sensitive data identification module are redacted from the primary dump by the post processor to output a redacted dump. Pages tagged as non-sensitive (e.g., in system/application meta-data) in the primary dump may remain untouched in the redacted dump. If a sensitive data string was redacted within a page by the sensitive data identification module using the redaction string, but the page in which the redacted string is located is not tagged as sensitive, the post processor may copy the page that includes the redacted string without modification from the work file to the redacted dump. The post processor may also output information regarding redacted sensitive data with the redacted dump. After the redacted dump is captured in a memory, the post processor may create component data records to describe the redacted data. Entries may be created in the component data records to describes all pages that were redacted by the sensitive data identification module. The component data records may be output with the redacted dump, in order to provide a user with information regarding the redacted sensitive data.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
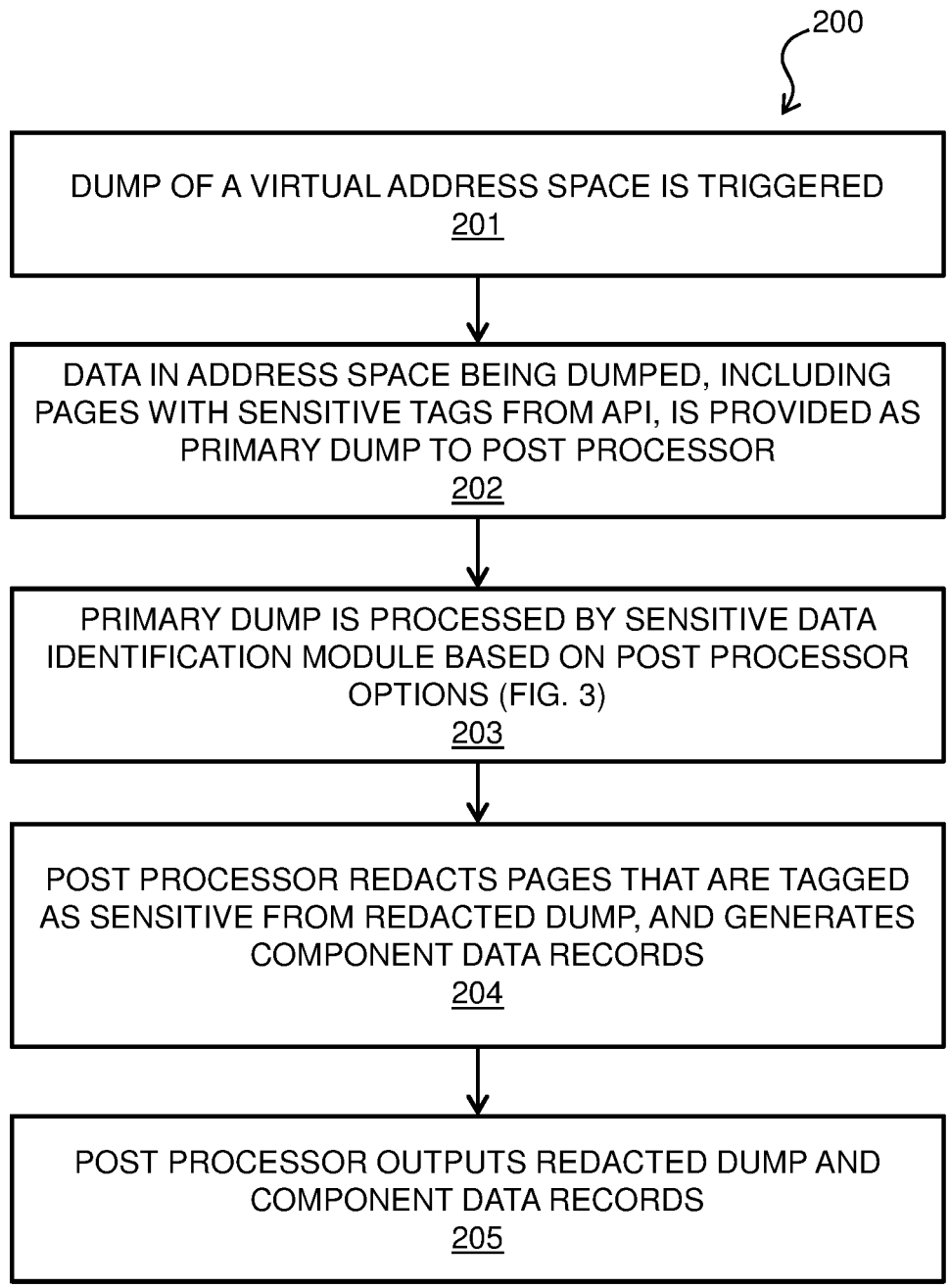
FIG. 2 is a process flow diagram of an example method for sensitive data redaction in a memory dump in accordance with one or more embodiments of the present invention.

FIG. 2 is a process flow diagram of a method 200 for sensitive data redaction in a memory dump in accordance with one or more embodiments of the present invention. The method 200 can be implemented with any suitable computing device, such as the computer system 100 of FIG. 1. In block 201 of method 200, a dump of a virtual address space is triggered by, for example, an error in the computer system. The dump may be triggered in block 201 during execution of an application that is using the address space that targeted for the dump. In block 202, the data from the targeted address space is provided as a primary dump to a dumping module comprising a post processor. The primary dump may include virtual memory pages in the virtual address space that was targeted for the dump that are tagged as sensitive based on memory tagging that was performed using, for example, calls to a memory tagging API by the application that was using the address space before the dump was triggered. In block 203, a sensitive data identification module of the post processor examines any untagged pages in the primary dump for sensitive data. The sensitive data identification module may not examine any data from pages that were explicitly tagged as either sensitive or not sensitive by the memory tagging API. The sensitive data identification module may identify sensitive data in the untagged memory pages of the primary dump in any appropriate manner based on one or more post processor options that may be configured by a user. The sensitive data identification module may process the untagged pages in the primary dump in block 203 based on one or more post processor options, including but not limited to a parallelism factor and a redaction string. The post processor options may be determined by a user (e.g., an administrator) of the computer system in some embodiments. Block 203 of FIG. 2 is discussed in further detail below with respect to method 300 of FIG. 3. The post processor may, in various embodiments of block 203, tag full pages as containing sensitive data, and/or overwrite sensitive data strings within untagged pages using, for example, a redaction string, in order to create a work file.

In block 204, the post processor redacts (e.g., removes or encrypts) any data corresponding to any virtual address pages that are tagged as sensitive in the primary dump or the work file to produce a redacted dump. The pages that are redacted in block 204 may have been tagged by either the API before the dump was triggered in block 201, or by the sensitive data identification module in block 203. Any untagged page containing a string that was overwritten by the sensitive data identification module using the redaction string may be copied without modification from the work file to the redacted dump in block 204. The post processor may also generate component data records in block 204 to describe the redacted data. In block 205, the post processor outputs the redacted dump that does not include the sensitive data. The post processor may also output the component data records that describe the redacted data in block 205. Method 200 of FIG. 2 may be triggered whenever a memory dump is triggered in a computer system such as computer system 100.

In some embodiments, the component data records may be determined by the post processor in block 204 and output with the redacted dump in block 205 to provide statistics on the sensitive data processing of method 200. The component data records may include a plurality of entries, each entry corresponding to a redaction, and may include any appropriate information that describes a redaction, including but not limited to an amount of redacted data, a memory location, and a type of the redacted data.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
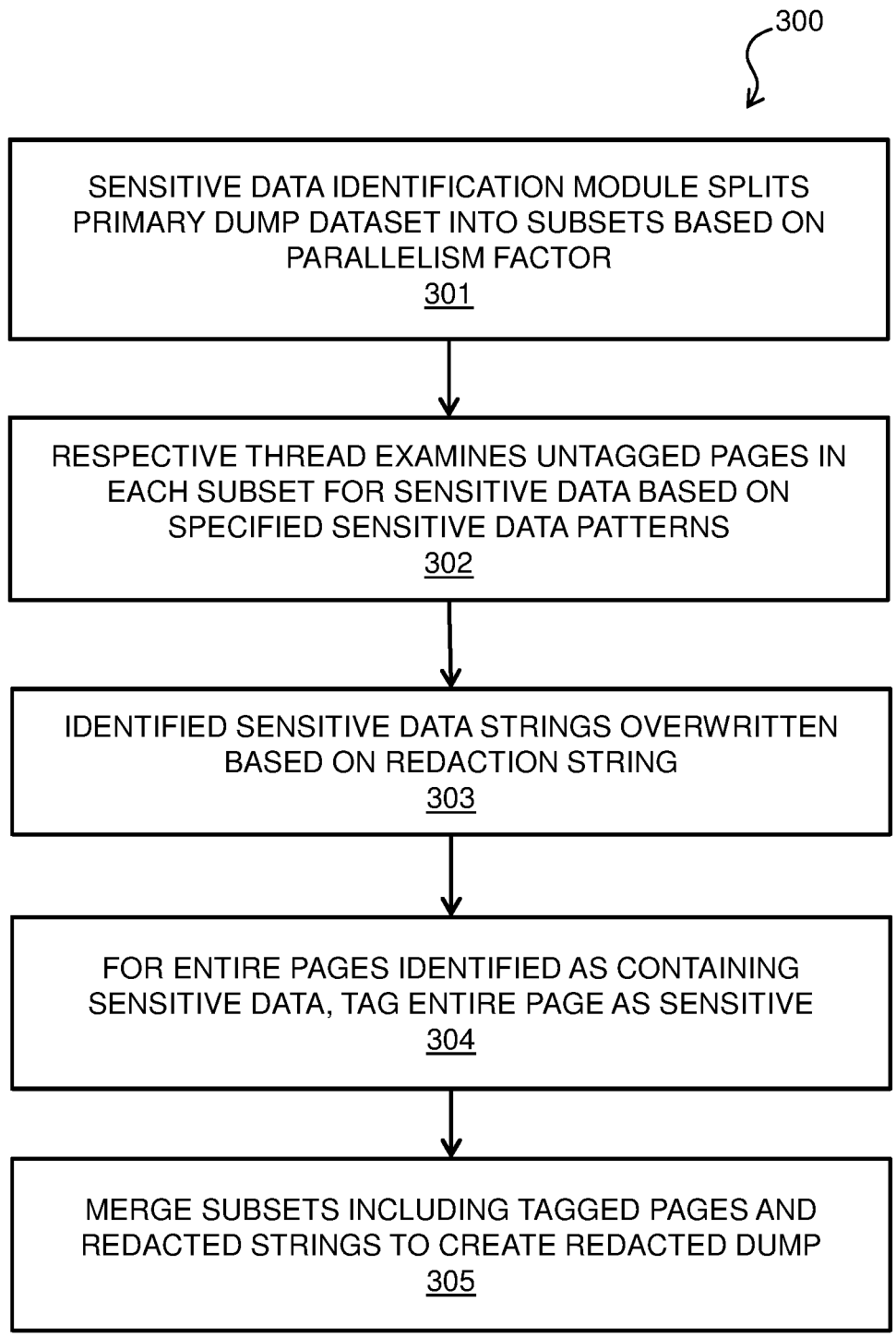
FIG. 3 is a process flow diagram of an example method for sensitive data redaction in a memory dump in accordance with one or more embodiments of the present invention.

FIG. 3 is a process flow diagram of a method 300 for sensitive data redaction in a memory dump in accordance with one or more embodiments of the present invention. The method 300 can be implemented with any suitable computing device, such as the computer system 100 of FIG. 1. Method 300 of FIG. 3 may be performed in block 203 of method 200 of FIG. 2. In block 301 of method 300, the sensitive data identification module in the post processor splits the data in the primary dump into a plurality of subsets based on a parallelism factor. The parallelism factor is a post processor option that may be set by a user (e.g., an administrator) of the computer system via, for example, a post processor options user interface (UI). The parallelism factor may be any appropriate number, and may specify a number of processor threads that may be allocated to the sensitive data identification module to process the primary dump. The subsets may be equal portions of the primary dump in some embodiments, and may each correspond to a respective single thread that is allocated to the sensitive data identification module. The number of subsets may correspond to the number of threads specified by the parallelism factor. In block 302, each thread that is allocated to the sensitive data identification module examines a respective subset of the primary dump data in the work file. Data that is located in pages that are tagged by the memory tagging API as either sensitive or not sensitive is not examined by the sensitive data identification module in block 302. A thread may determine whether a 4K page is tagged based on metadata of the page in some embodiments. Data in untagged pages may be identified as sensitive by the sensitive data identification module based on any appropriate criteria; the sensitivity criteria may be set by a user (e.g., an administrator) of the computer system via the post processor options UI. In various embodiments, isolated strings of sensitive data and/or entire pages of sensitive data may be identified by the sensitive data identification module.

In block 303, an isolated data string that is identified as sensitive by a thread of the sensitive data identification module may be overwritten using a redaction string. In some embodiments, the redaction string may be specified by a user of the computer system via the post processor options UI; in other embodiments, the redaction string may be a default string. The redaction string may be any appropriate string. A page that contains one or more isolated strings may be partially redacted using the redaction string. The metadata of a page that includes a redacted string may be updated to indicate partial redaction in the page by the sensitive data identification module in block 303. In block 304, for entire pages that are identified as being sensitive data, the sensitive data identification module may tag the metadata of the entire page as sensitive. An entire page may be determined to be sensitive based on any appropriate redaction criteria. Any sensitive data that is identified in the primary dump by the thread(s) of the sensitive data identification module may be handled according to either block 303 or block 304 of method 300; a plurality of strings may be redacted according to block 303, and a plurality of pages may be tagged according to block 304. In block 305, after all of the data from the untagged pages of the primary dump have been processed by the one or more threads allocated to the sensitive data identification module, the post processor merges the processed subsets of the primary dump, including redacted strings according to block 303 and sensitive page tags according to block 304, to generate a work file for the redacted dump. The merging of block 305 may use a merge function such as DFSORT's MERGE in some embodiments. The work file also includes any memory tagging API tags that were included in the primary dump. The work file is then processed by the post processor as described above with respect to blocks 204 and 205 of method 200 of FIG. 2 to produce the redacted dump.

A post processor options UI may be provided in some embodiments in order to allow a user (e.g., an administrator) to configure the operation of the post processor as described above with respect to method 300 of FIG. 3. In some embodiments, options of the post processor that may be configured via the UI may include, but are not limited to, a dump dataset name, a parallelism factor (e.g. a number of threads to be used by the sensitive data identification module for processing the primary dump dataset), particular sensitive data patterns to be identified by the sensitive data identification module (e.g., GDPR and/or HIPAA compliance, general expressions, and/or custom strings), and a redaction string that may be used to overwrite sensitive data patterns that are identified by the sensitive data identification module according to block 303. In some embodiments, default values may be used by the post processor if a user does not configure the post processor options via the post processor options UI. For example, a default parallelism factor may specify that four threads are used by the sensitive data identification module to process the primary dump to create the work file, such that the data of the primary dump is split into four subsets in block 301. In some embodiments, the sensitive data identification module may be disabled via the post processor options UI.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
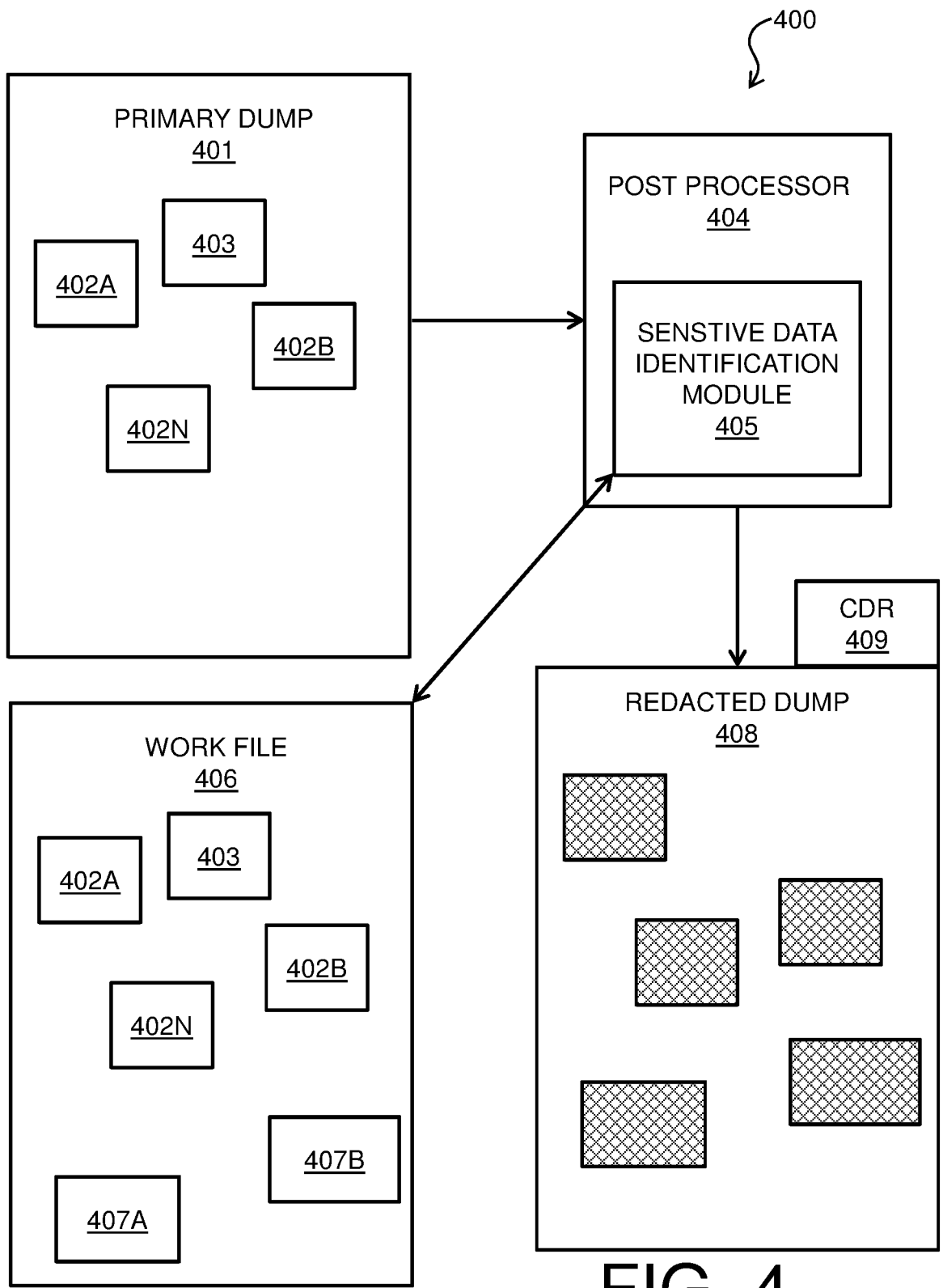
FIG. 4 is a block diagram of an example system for sensitive data redaction in a memory dump in accordance with one or more embodiments of the present invention.

FIG. 4 is a block diagram of a system 400 for sensitive data redaction in a memory dump in accordance with one or more embodiments of the present invention. System 400 includes a primary dump 401 of a virtual address space that is targeted for a memory dump, as described above with respect to block 201 of method 200 of FIG. 2. The primary dump 401 may include all data corresponding to a targeted virtual address space. The primary dump 401 includes sensitive data that is located in tagged virtual memory pages, i.e., sensitive data 402A-N. Sensitive data 402A-N may be located in memory pages that were tagged as sensitive using an API. The primary dump may also include a memory page 403 that is tagged as not sensitive using the API. The primary dump 401 is provided to a post processor 404 of a computer system (e.g., computer system 100 of FIG. 1, as part of software 111) as described with respect to block 202 of method 200 of FIG. 2.

The sensitive data identification module 405 in the post processor 404 processes the data in untagged pages in the primary dump according to method 300 of FIG. 3 to produce work file 406, including sensitive data 407A-B that was identified by the sensitive data identification module. Data located in sensitive data 402A-N and tagged memory page 403 are not processed by the sensitive data identification module 405. In various embodiments, sensitive data 407A-B may include one or more individual data strings that were overwritten using a redaction string by sensitive data identification module 405 (as described with respect to block 303 of method 300), and/or one or more entire pages that are tagged as sensitive by the sensitive data identification module 405 (as described with respect to block 304 of method 300).

The post processor 404 may then redact (e.g., remove or encrypt) the identified sensitive data 402A-N and 406A-B in the work file 406 to produce redacted dump 408 as described with respect to blocks 204 and 205 of method 200 of FIG. 2. Data located in tagged memory page 403 is not redacted in the redacted dump 408. In embodiments in which sensitive data 407A-B includes individual data strings that were overwritten using a redaction string by the sensitive data identification module 405, if a redacted data string is located in a page that was not tagged as sensitive by the sensitive data identification module 405, the page containing the redacted data string may be copied without modification from the work file 406 to the redacted dump 408. The redacted dump 408 may prevent unauthorized personnel from gaining access to sensitive, confidential, or otherwise protected information that would be available in primary dump 401. The post processor 404 may also output component data records 409 describing the sensitive data 402A-N and 407A-B that was redacted in redacted dump 408.

It is to be understood that the block diagram of FIG. 4 is not intended to indicate that the system 400 is to include all of the components shown in FIG. 4. Rather, the system 400 can include any appropriate fewer or additional components not illustrated in FIG. 4 (e.g., additional dumps, modules, tagged or untagged memory pages, etc.). Further, the embodiments described herein with respect to system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system, comprising a processor configured to:
based on a dump of a virtual address space being triggered:
receive a primary dump corresponding to the virtual address space, the primary dump including one or more tagged memory pages, wherein the one or more tagged memory pages are each tagged as one of sensitive or not sensitive;
identify, by a sensitive data identification module, sensitive data that is located outside of the of the one or more tagged memory pages in the primary dump, wherein data corresponding to the one or more tagged memory pages is not processed by the sensitive data identification module; and
redact data corresponding to the sensitive data and the one or more tagged memory pages to determine a redacted dump.

2. The system of claim 1, wherein:
the one or more tagged memory pages are tagged as one of sensitive or not sensitive by a memory tagging application programming interface (API) that is called during execution of an application that stores data in the virtual address space before the dump of the virtual address space is triggered;
and
data corresponding to a tagged memory page of the one or more tagged memory pages that is tagged as not sensitive is not redacted.

3. The system of claim 1, wherein identifying, by the sensitive data identification module, sensitive data that is located outside of the of the one or more tagged memory pages in the primary dump comprises:
splitting the primary dump into a plurality of subsets based on a parallelism factor;
processing each of the plurality of subsets by a respective thread that is allocated to the sensitive data identification module; and
merging the plurality of processed subsets to create a work file.

4. The system of claim 3, wherein processing a subset of the plurality of subsets by a respective thread that is allocated to the sensitive data identification module comprises:
identifying a string corresponding to sensitive data by the respective thread; and
overwriting the string with a redaction string.

5. The system of claim 4, wherein the processor is further configured to:
copy a memory page including the overwritten string from the work file to the redacted dump.

6. The system of claim 3, wherein processing a subset of the plurality of subsets by a respective thread that is allocated to the sensitive data identification module comprises:
tagging an entire memory page corresponding to sensitive data as sensitive, wherein the tagged entire memory page is redacted from the work file to determine the redacted dump.

7. The system of claim 1, wherein the processor is further configured to:
determine a component data record based on the redacting; and
output the component data record with the redacted dump, wherein the component data record comprises an amount of redacted data, a type of redacted data, and a location of redacted data in the redacted dump.

8. A computer-implemented method, comprising:
based on a dump of a virtual address space being triggered:
receiving, via a processor, a primary dump corresponding to the virtual address space, the primary dump including one or more tagged memory pages, wherein the one or more tagged memory pages are each tagged as one of sensitive or not sensitive;
identifying, by a sensitive data identification module, sensitive data that is located outside of the of the one or more tagged memory pages in the primary dump, wherein data corresponding to the one or more tagged memory pages is not processed by the sensitive data identification module; and
redacting data corresponding to the sensitive data and the one or more tagged memory pages to determine a redacted dump.

9. The method of claim 8,
the one or more tagged memory pages are tagged as one of sensitive or not sensitive by a memory tagging application programming interface (API) that is called during execution of an application that stores data in the virtual address space before the dump of the virtual address space is triggered;
and
data corresponding to a tagged memory page of the one or more tagged memory pages that is tagged as not sensitive is not redacted.

10. The method of claim 8, wherein identifying, by the sensitive data identification module, sensitive data that is located outside of the of the one or more tagged memory pages in the primary dump comprises:
splitting the primary dump into a plurality of subsets based on a parallelism factor;
processing each of the plurality of subsets by a respective thread that is allocated to the sensitive data identification module; and
merging the plurality of processed subsets to create a work file.

11. The method of claim 10, wherein processing a subset of the plurality of subsets by a respective thread that is allocated to the sensitive data identification module comprises:
identifying a string corresponding to sensitive data by the respective thread; and
overwriting the string with a redaction string.

12. The method of claim 11, the method further comprising:
copying a memory page including the overwritten string from the work file to the redacted dump.

13. The method of claim 10, wherein processing a subset of the plurality of subsets by a respective thread that is allocated to the sensitive data identification module comprises:

tagging an entire memory page corresponding to sensitive data as sensitive, wherein the tagged entire memory page is redacted from the work file to determine the redacted dump.

14. The method of claim 8, the method further comprising:

determining a component data record based on the redacting; and outputting the component data record with the redacted dump, wherein the component data record comprises an amount of redacted data, a type of redacted data, and a location of redacted data in the redacted dump.

15. A computer program product comprising:

a computer readable storage medium having program instructions embodied therewith, the program instructions executable by a processing device to cause the processing device to perform a method comprising:

based on a dump of a virtual address space being triggered:

receiving a primary dump corresponding to the virtual address space, the primary dump including one or more tagged memory pages, wherein the one or more tagged memory pages are each tagged as one of sensitive or not sensitive;

identifying, by a sensitive data identification module, sensitive data that is located outside of the of the one or more tagged memory pages in the primary dump, wherein data corresponding to the one or more tagged memory pages is not processed by the sensitive data identification module; and redacting data corresponding to the sensitive data and the one or more tagged memory pages to determine a redacted dump.

16. The computer program product of claim 15, wherein:

the one or more tagged memory pages are tagged as one of sensitive or not sensitive by a memory tagging application programming interface (API) that is called during execution of an application that stores data in the virtual address space before the dump of the virtual address space is triggered;

and data corresponding to a tagged memory page of the one or more tagged memory pages that is tagged as not sensitive is not redacted.

17. The computer program product of claim 15, wherein identifying, by the sensitive data identification module, sensitive data that is located outside of the of the one or more tagged memory pages in the primary dump comprises:

splitting the primary dump into a plurality of subsets based on a parallelism factor;

processing each of the plurality of subsets by a respective thread that is allocated to the sensitive data identification module; and merging the plurality of processed subsets to create a work file.

18. The computer program product of claim 17, wherein processing a subset of the plurality of subsets by a respective thread that is allocated to the sensitive data identification module comprises:

identifying a string corresponding to sensitive data by the respective thread; and overwriting the string with a redaction string.

19. The computer program product of claim 18, wherein the method further comprises:

copying a memory page including the overwritten string from the work file to the redacted dump.

20. The computer program product of claim 17, wherein processing a subset of the plurality of subsets by a respective thread that is allocated to the sensitive data identification module comprises:

tagging an entire memory page corresponding to sensitive data as sensitive, wherein the tagged entire memory page is redacted from the work file to determine the redacted dump.

* * * * *